J. W. AND E. KIPPEN.
CONVERTIBLE AUTOMOBILE BODY.
APPLICATION FILED MAY 8, 1919. RENEWED JAN. 31, 1922.

1,410,192.                                     Patented Mar. 21, 1922.

Inventors
James W. Kippen
Elma Kippen

By Whittemore, Hulbert, and Whittemore
Attorneys

UNITED STATES PATENT OFFICE.

JAMES W. KIPPEN AND ELMA KIPPEN, OF TECUMSEH, MICHIGAN.

CONVERTIBLE AUTOMOBILE BODY.

1,410,192.     Specification of Letters Patent.     Patented Mar. 21, 1922.

Application filed May 8, 1919, Serial No. 295,583. Renewed January 31, 1922. Serial No. 533,068.

*To all whom it may concern:*

Be it known that we, JAMES W. KIPPEN and ELMA KIPPEN, both citizens of the United States of America, residing at Tecumseh, in the county of Lenawee and State of Michigan, have invented certain new and useful Improvements in Convertible Automobile Bodies, of which the following is a specification, reference being had therein to the accompanying drawings.

This invention relates to convertible automobile bodies and its object is to provide an automobile body of the double-seated type having the back of the front seat adjustable for use either in its normal raised position or in a lowered position flush with and bridging the two seats so as to form in effect a couch or bed.

The invention consists further in the structural features and arrangements of parts hereinafter fully set forth.

Figure 1:
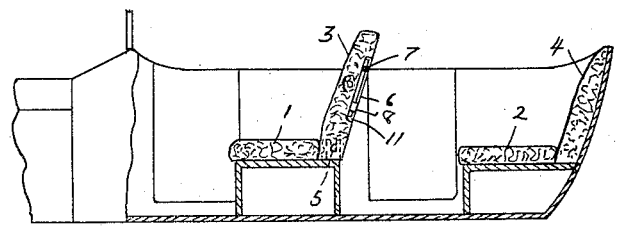
Figure 1 is a longitudinal vertical sectional view of an automobile body improved in accordance with the invention, the normal position of the adjustable seat back being shown.
Figure 2:
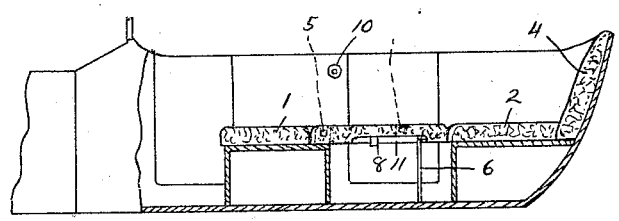
Figure 2 is a similar view showing the seats converted into a couch.
Figure 3:
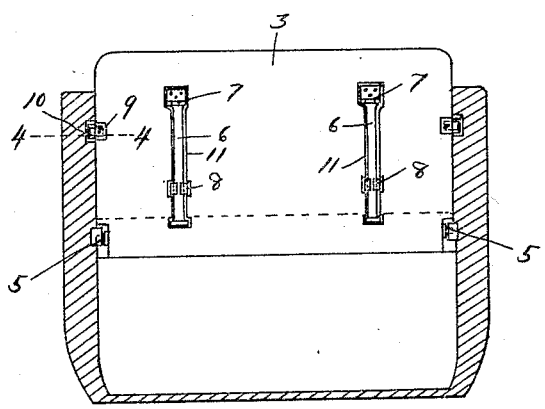
Figure 3 is a rear view of the adjustable back of the front seat.

In these views the reference characters 1 and 2 respectively designate the front and rear seats of an automobile body, and 3 and 4 indicate the respective backs of said seats. Said seats occupy the usual spaced relation and except for the adjustability of the back of the front seat may be of an ordinary construction. Said adjustability is secured by hinging said back 3 to the seat, as is indicated at 5, thus adapting the back to swing rearwardly to the horizontal position disclosed in Figure 2, in which position the front and rear seats coact with said back to form a couch. In said lowered position the back 3 is adapted to be supported by a pair of horizontally-spaced legs 6 which are pivoted thereto at their upper ends, as indicated at 7. When the back member 3 is in its normal raised position, said legs are respectively engageable with spring clips 8 upon said member 3, whereby they are retained in close proximity to said member. Upon the side edges of the member 3, snap fastening devices 9 are respectively mounted, which devices are engageable in the normal position of the member 3 with suitable sockets 10 carried by the body at each side thereof (see Figure 2).

The above described invention is particularly desirable when a car is used for touring or for long trips of any kind. The space beneath the seats may be utilized, if desired, to carry bedding for use when the body is converted for sleeping purposes. The upholstery and springs of the seats eliminate necessity for a mattress and provide a comfortable sleeping place when adjusted for that purpose.

It is preferred to form recesses 11 in the back member 3 to serve as receptacles for the legs 6 when said member is in its normal raised position, the clips 8 being disposed within said recesses.

Figure 5:
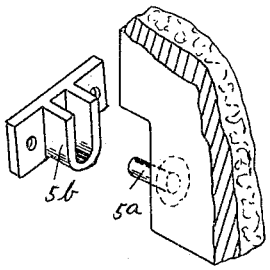
Figure 5 is a detail perspective view showing the pivotal supporting means for the back of the front seat.
Figure 4:
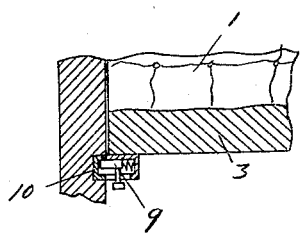
Figure 4 is a detail sectional view of a latch mechanism which holds the adjustable seat back normally raised.

It is to be noted that the pivotal arrangement as shown in detail in Figure 5 is such as to permit the pivot pins 5ᵃ to be introduced into the sockets 5ᵇ through a bodily downward movement of the back 3. This facilitates the original assembly and also provides for a ready removal and replacement of the back for the purpose of cleaning or repairing same.

What we claim as our invention is:

A convertible vehicle body comprising a front seat provided with a back, and a rear seat, said back being pivoted to its seat and adjustable to a lowered position substantially flush with said seats and bridging the space therebetween, a leg pivoted to said back for supporting the same in its lowered position, the back being formed with a pocket receiving said leg in the normal position of the back, spring means for normally retaining said leg in said pocket, spring means normally maintaining the raised position of the back, and pivotal supporting means for the back permitting upward removal of the back from the seat.

In testimony whereof we affix our signatures.

JAMES W. KIPPEN.
ELMA KIPPEN.